UNITED STATES PATENT OFFICE.

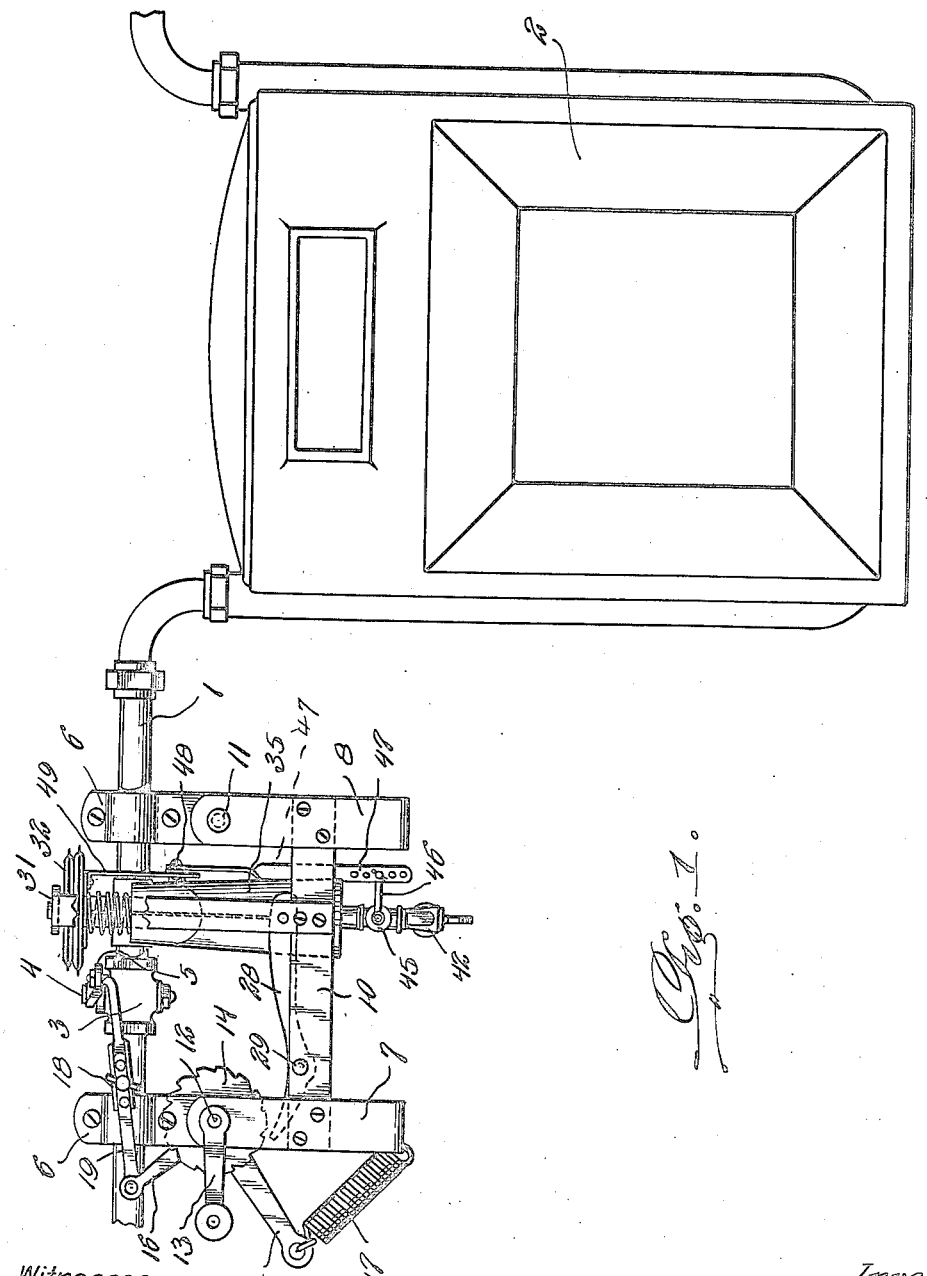

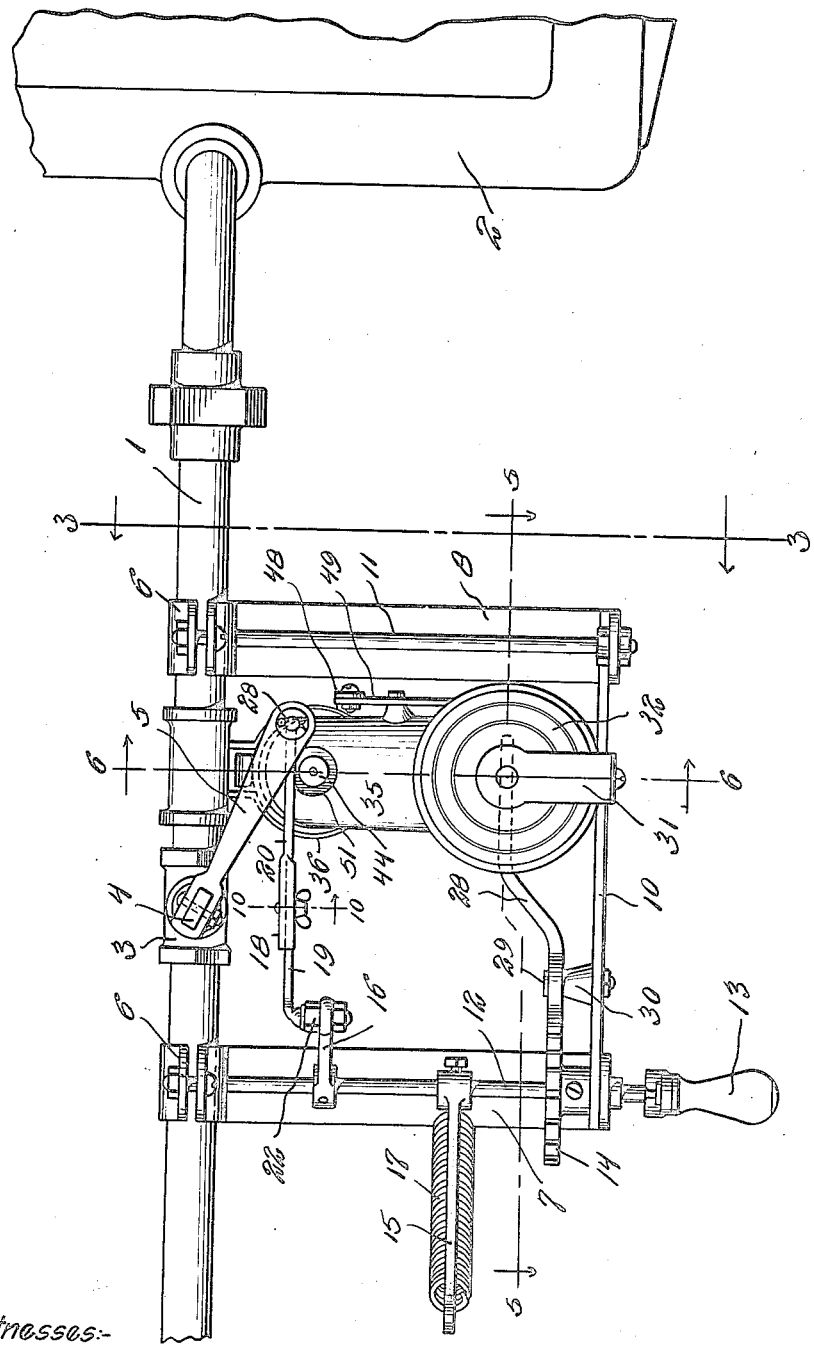

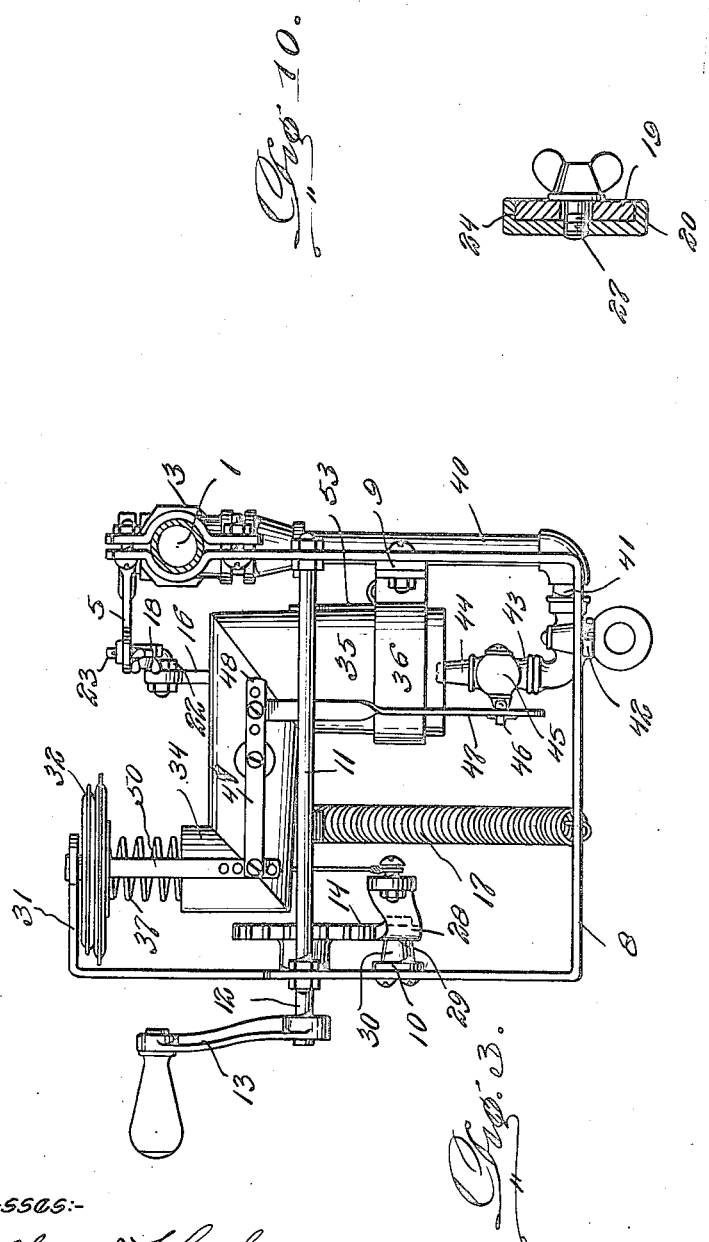

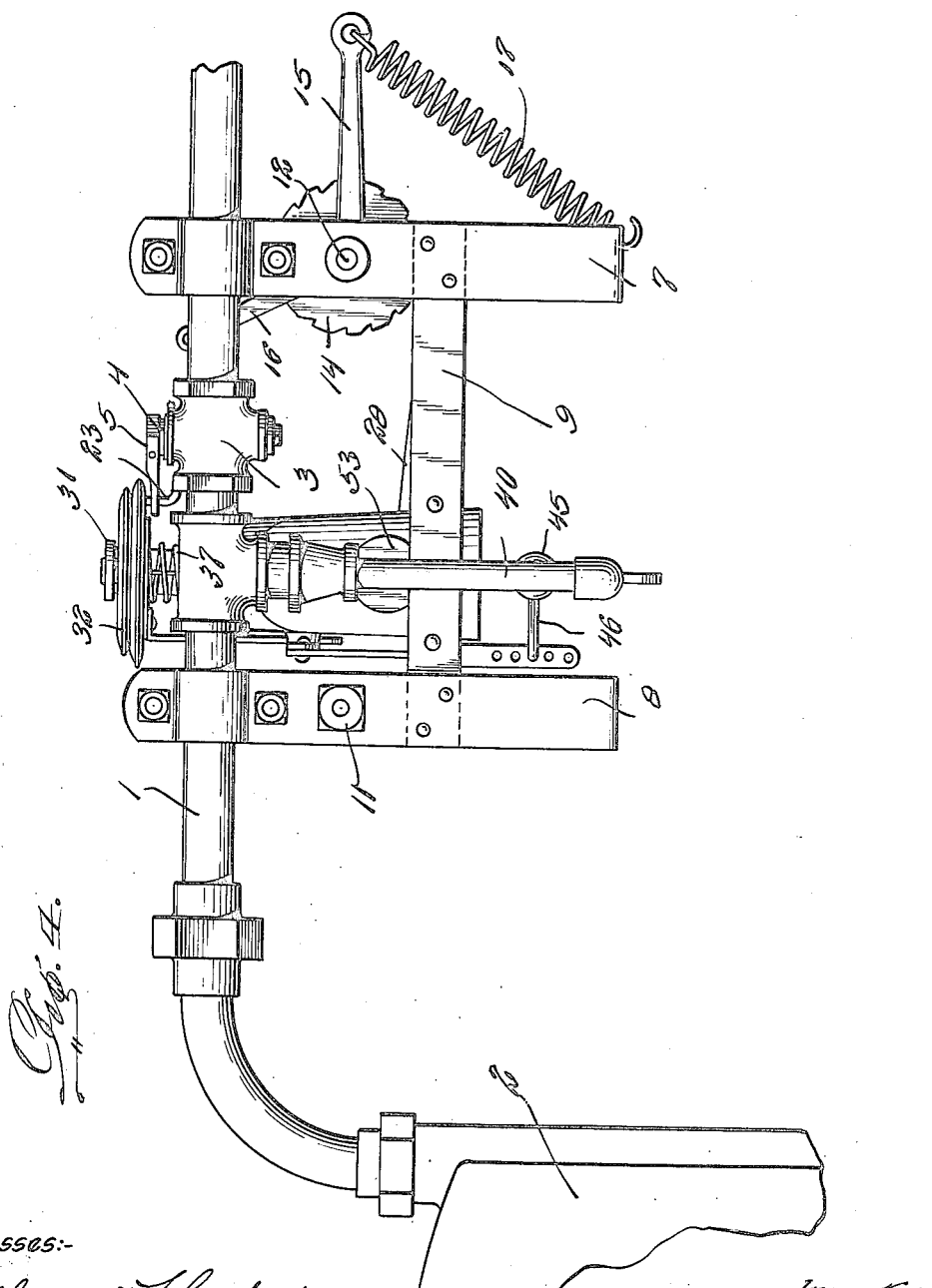

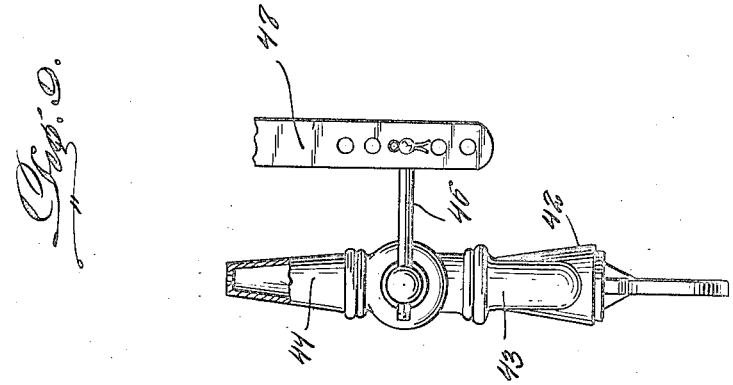
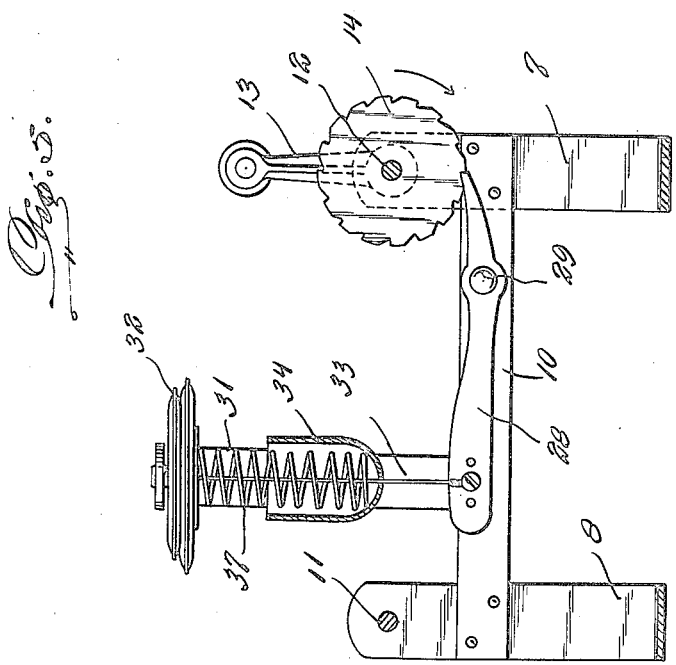

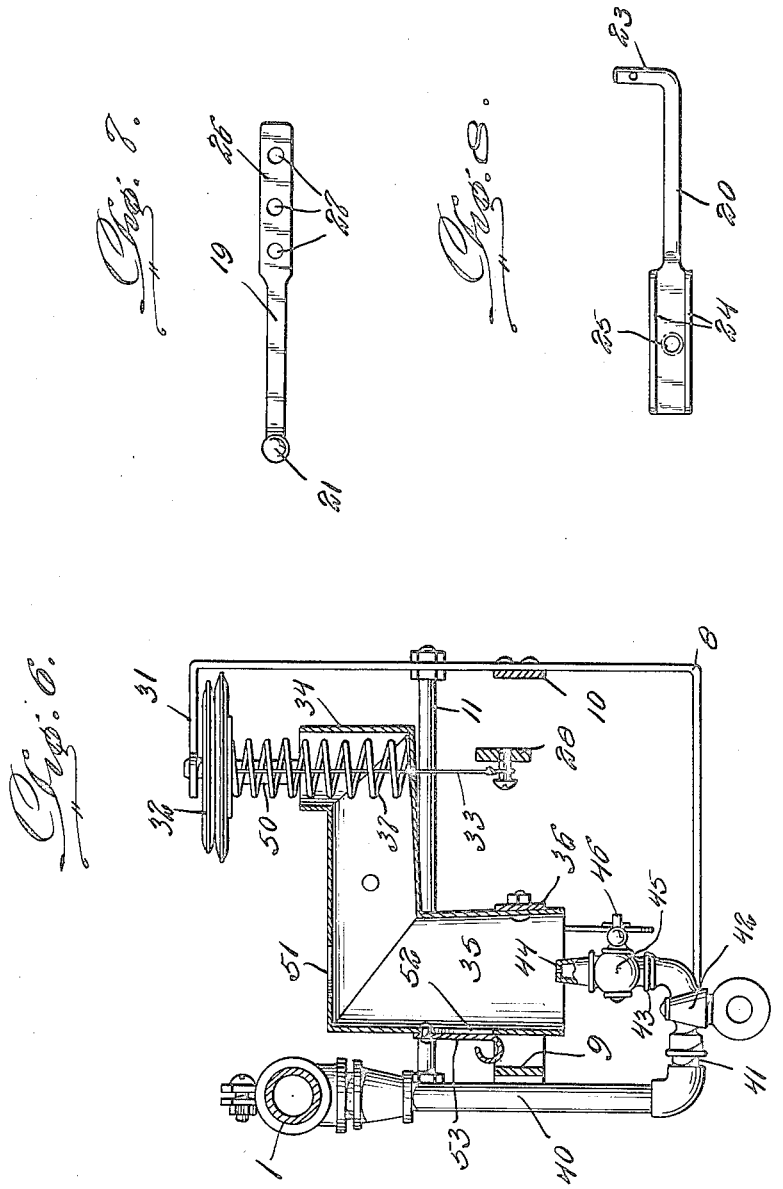

HARRY JERVIS, OF WEIRTON, WEST VIRGINIA.

AUTOMATIC GAS-CONDUIT CONTROL MEANS.

1,416,831.                    Specification of Letters Patent.    Patented May 23, 1922.

Application filed August 17, 1921. Serial No. 492,958.

*To all whom it may concern:*

Be it known that I, HARRY JERVIS, a citizen of the United States, residing at Weirton, in the county of Hancock and State of West Virginia, have invented new and useful Improvements in Automatic Gas-Conduit Control Means, of which the following is a specification.

One object of my present invention is the provision of reliable automatic means for cutting off the supply of gas to the burners in a house in the event of the supply of gas failing during the use of one or more burners, this with a view to averting accidents.

Another object is the provision in cut-off means for the purpose described, of a pilot light and an equipment for automatically assuring a plentiful supply of gas to the pilot light irrespective of fluctuations in the gas supply, thereby adapting the pilot light to maintain the cut-off valve in open position so long as gas is supplied to the burner or burners.

Another object is the provision of a simple, compact and durable apparatus embodying the means defined for the purposes set forth.

To the attainment of the foregoing, the invention consists in the improvement as hereinafter described and definitely claimed.

In the accompanying drawings, forming part of this specification:—

Figure 1 is a side elevation showing my improvement as properly arranged relatively to a gas meter and a house pipe leading therefrom.

Figure 2 is a top plan view of the apparatus on an enlarged scale.

Figure 3 is a vertical transverse section taken in the plane indicated by the line 3—3 of Figure 2.

Figure 4 is an enlarged elevation of the side of the apparatus opposite to that shown in Figure 1.

Figure 5 is a longitudinal vertical section taken in the plane indicated by the line 5—5 of Figure 2.

Figure 6 is a vertical transverse section taken in the plane indicated by the line 6—6 of Figure 2.

Figures 7 and 8 are enlarged details of the sections comprised in the pitman complementary to the cut-off valve.

Figure 9 is an enlarged detail view showing the adjustable connection of the thermostat rod to the crank on the stem of the pilot-light valve.

Figure 10 is an enlarged detail transverse section taken in the plane indicated by the line 10—10 of Figure 2 and showing the connection of the sections in the pitman of the cut-off valve.

Similar numerals of reference designate corresponding parts in all of the views of the drawings.

I have elected to show my improvement as applied to a house pipe 1 leading from a gas meter 2, but I desire it distinctly understood that it is within the purview of my invention to use the improvement on any conduit or in conjunction with any conduit to which it is applicable.

In the present specific embodiment of my invention, which is the best of which I am cognizant, I arrange in the conduit 1 a cut-off valve 3 on the stem 4 of the plug of which is a crank 5. The said cut-off valve 3 is shown in Figure 2 in open, working position and is shown in Figure 1 in closed or idle position.

Clamped at 6 on or otherwise fixed with respect to the conduit 1 are U-shaped frame members 7 and 8, Figures 1, 2, 3, 4 and 5, spaced apart and arranged in parallelism at right angles to the conduit 1. The said frame members 7 and 8 are connected together in one frame unit by back and front longitudinal frame bars designated by 9 and 10, respectively, Figures 4 and 2. The frame or frame unit also comprises a transverse rod 11 between the upright portions of the member 8. In the upright portions of the frame member 7 is journaled a transverse shaft 12 arranged in parallelism with the rod 11 as best shown in Figure 2. On the forward end of the said shaft 12 is a hand crank 13, and to the shaft is fixed a ratchet disk 14, a crank 15 and a crank 16, Figures 1, 2 and 4. Between the crank 15 and the lower bar of the frame member 7 is interposed a retractile spring 17 shown in Figures 2, 3 and 4 in stretched or expanded state as when the cut-off valve 3 is open, and in Figure 1 in retracted or contracted state as when said cut-off valve is closed, the valve in fact being closed by the retraction of the spring 17. The crank 16 on the shaft 12 is connected with the crank 5 of the cut-off valve 3 through the medium of a pitman 18 made up of sections 19 and 20, Figures 7 and 8; the section 19 having a ball 21 disposed in a socket 22 on the crank 16, and the section 20 having a lateral extremity 23 journaled and appropriately secured in the crank 5. The section 20 is channeled at 24 and apertured at 25, and the section 19 is provided with a portion 26 in which is a plurality of apertures 27; the said portion 26 being arranged in the channeled portion 24, and the two sections being connected by a bolt 27, threaded in the section 20 as best shown in Figure 10. A pawl 28 for cooperation with the ratchet disk 14 is fulcrumed at 29 on a lateral projection 30 carried by the frame bar 10. On the front upright portion of the frame member 8, Figures 3 and 6, is an overhanging arm 31, and disposed below and appropriately connected to said arm are hollow wafers 32 which per se are of the ordinary well known construction and constitute the thermostat of my improvement in the present embodiment of the invention. The said wafers 32 are appropriately connected together, and the lowermost wafer is connected through the medium of a depending rod 33; Figures 5 and 6, with the arm of the pawl 28 remote from the ratchet disk 14. The rod 33 extends through the upright discharge portion 34, Figures 3 and 5, of a flue 35 that is carried by a clamp bracket 36, on the rear upright portion of the frame member 8. In the said discharge portion 34 of the flue 35 is seated the lower end of an expansion spring 37 which surrounds the rod 33 and bears at its upper end against the thermostate, and against the action of which the rod 33 is forced downwardly by the expansion of the thermostat due to the action of heat supplied through the flue 35. Connected to and depending from the pipe 1 is a pipe 40, Figures 3, 4 and 6, on the lower end of which is a forwardly directed arm 41, equipped with a manually-controlled cock 42. At its forward end the said arm 41 merges into an upstanding pipe 43 equipped with a pilot light or burner 44 and with what I designate a pilot-light valve 45. The said pilot light 44 is disposed in the receiving portion of the flue 35, and on the stem of its valve 45 is a crank 46, Figure 9 to which is connected, preferably in adjustable manner, the pendent bar 47 of a thermostat connection 48 best shown in Figure 3 which connection also comprises a lever 49 fulcrumed on the flue 35 and having one of its arms connected, preferably in adjustable manner, to the pendent bar 47, and a bar 50 appropriately connected to and extending downwardly from the thermostat and connected, preferably in adjustable manner, to the other arm of the lever 49.

At 51 the flue 35 is provided with a vent for the escape of excess heat, and at 52 said flue has an opening designed for the entry of air and adapted to be closed to a greater or less extent by an adjustable shutter 53, Figure 6. This, however, is not of the essence of my invention.

In the practical use of my improvement, the pilot burner 44 is lighted to supply heat through the flue 35 for the expansion of the thermostat and the movement of the pawl 28 by the thermostat into engagement with the ratchet disk 14. The crank 13 is then manually moved in the direction indicated by arrow in Figure 1 to open the cut-off valve 3 and put under tension the spring 17. Under normal conditions the pilot burner 44 remains lighted, and the cut-off valve 3 is retained in open position by the cooperation of the pawl 28 with the ratchet disk 14, and this against the tendency of the spring 17 to contract. In the event, however, of the supply of gas through the conduit 1 failing, it will be readily understood that following the going out of the pilot light 44, the thermostat will cool and by drawing upwardly on one arm of the pawl 28 will disengage the other arm thereof from the ratchet disk 14 whereupon retraction of the spring 17 will take place and will effect the closing of the cut-off valve.

It frequently happens under service conditions that the supply of gas in the conduit 1 fluctuates to a considerable extent. The described connection 48 best shown in Figure 3 is provided to meet the said contingency, for it will be readily understood that when a comparatively small quantity of gas is supplied to the pilot burner 44 and the thermostat 32 contracts to a slight extent in consequence, the connection 48 will operate to increase the opening of the valve 45 with the result that a greater volume of gas will be supplied to the pilot-burner 44—i. e., sufficient gas to maintain the expansion of the thermostat and thereby assure the retention of the pawl 28 in engagement with the ratchet disk 14 and the maintenance of the cut-off valve 3 in open state.

After the automatic closing of the cut-off valve 3 in the manner described, it will be understood that it is incumbent on some person in authority to light the pilot burner 44 subsequently to the re-establishment of the supply of gas, and to then turn the crank 13 and open the cut-off valve 3 when the improvement will be re-set for the automatic control of the cut-off valve.

It will be apparent from the foregoing that my novel control means is reliable in operation, particularly because of the provision for increasing the volume of gas supplied to the pilot burner when the head of gas in the conduit 1 falls below normal; also, that the present and preferred embodiment of the invention is simple and compact in construction, and is free from delicate parts such as are liable to get out of order after a short period of use.

I have entered into a detailed description of the construction and relative arrangement of parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. The combination of a conduit, a cut-off valve therein, a spring to close said valve, movable means adapted in one position to prevent closing of the valve by the spring, a pilot burner, a conduit between the first-named conduit and the pilot burner and provided with a valve means to close the cut-off valve when the same is released, and thermostatic means subject to heat from the pilot burner when the latter is lighted to increase the opening of the pilot-burner valve and connected with the said movable means to move the latter to another position to bring about closing of the cut-off means when the supply of gas fails.

2. The combination of a conduit, a cut-off valve therein and having a crank, a rotatable ratchet disk, a connection between the same and the cut-off valve, a spring to rotate the ratchet disk in one direction for the closing of the cut-off valve, a pawl for cooperation with the disk and adapted in one position to hold the disk against rotation by the spring, a pilot burner, a conduit between the first-named conduit and the pilot burner and provided with a valve means to close the cut-off valve when the same is released, and thermostatic means subject to heat from the lighted pilot burner to increase the opening of the pilot-burner valve and connected with the pawl and adapted when cool to disengage the pawl from the ratchet disk.

3. The combination of a conduit, a cut-off valve therein, a pilot-burner, a conduit between the first-named conduit and the pilot burner and provided with a valve means to close the cut-off valve when the same is released, and thermostatic means to increase the opening of the pilot-burner valve and to release the cut-off valve.

4. The combination of a conduit, a cut-off valve therein and having a crank, a rotatable ratchet disk, a connection between the same and the cut-off valve, a spring to rotate the ratchet disk in one direction for the closing of the cut-off valve, a pawl for cooperation with the disk and adapted in one position to hold the disk against rotation by the spring, a pilot burner connected with the conduit, and thermostatic means subject to heat from the lighted pilot burner and connected with the pawl and adapted when cool to disengage the pawl from the ratchet disk; the connection between the ratchet disk and the cut-off valve including a shaft to which the disk is fixed, crank arms fixed to the shaft and to one of which the spring is connected, and an adjustable pitman between the other crank arm and a crank on the stem of the cut-off valve.

5. The combination of a conduit, a cut-off valve therein, a spring to close said valve, movable means adapted in one position to prevent closing of the valve by the spring, a pilot burner, a conduit between the first-named conduit and the pilot burner and provided with a valve means to close the cut-off valve when the same is released, and thermostatic means subject to heat from the pilot burner when the latter is lighted to increase the opening of the pilot-burner valve and connected with the said movable means to move the latter to another position to bring about closing of the cut-off means when the supply of gas fails, with a flue intermediate of the pilot burner and the thermostatic means.

In testimony whereof, I affix my signature.

HARRY JERVIS.